US012149673B2

(12) United States Patent
Ye et al.

(10) Patent No.: US 12,149,673 B2
(45) Date of Patent: Nov. 19, 2024

(54) SYSTEM AND METHOD FOR RECONSTRUCTING 3-D SHAPES OF OBJECTS FROM REFLECTION IMAGE

(71) Applicant: Board of Supervisors of Louisiana State University and Agricultural and Mechanical College, Baton Rouge, LA (US)

(72) Inventors: Jinwei Ye, Baton Rouge, LA (US); Jie Lu, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 0 days.

(21) Appl. No.: 18/138,199

(22) Filed: Apr. 24, 2023

(65) Prior Publication Data

US 2023/0362346 A1   Nov. 9, 2023

Related U.S. Application Data

(63) Continuation of application No. 16/874,632, filed on May 14, 2020, now Pat. No. 11,671,580.
(Continued)

(51) Int. Cl.
*G02F 1/1335* (2006.01)
*G02F 1/01* (2006.01)
(Continued)

(52) U.S. Cl.
CPC ......... *H04N 13/254* (2018.05); *G02F 1/0136* (2013.01); *G02F 1/133536* (2013.01); *H04N 13/207* (2018.05)

(58) Field of Classification Search
CPC ............. G02F 1/1335; G02F 1/133528; G02F 1/133541; G02F 1/133536; G02F 1/0136;
(Continued)

(56) References Cited

U.S. PATENT DOCUMENTS

| 6,229,913 B1 | 5/2001 | Nayar et al. |
| 7,098,435 B2 | 8/2006 | Mueller et al. |

(Continued)

OTHER PUBLICATIONS

Ding, et al., "Recovering specular surfaces using curved line images", 2009 IEEE Conference on Computer Vision and Pattern Recognition, Jun. 20-25, 2009.
(Continued)

*Primary Examiner* — Thoi V Duong
(74) *Attorney, Agent, or Firm* — Thomas | Horstemeyer, LLP

(57) ABSTRACT

A system and method are provided for reconstructing 3-D point cloud. A light source generates light that is received by a polarization field generator, which generates a polarization field that illuminates the target object being imaged such that each outgoing ray has a unique polarization state. A camera captures images of the illuminated target object and the captured images are received by a processor that: (1) performs a polarization field decoding algorithm that decodes the polarization field to obtain a set of incident rays; (2) performs a camera ray decoding algorithm to obtain a set of camera rays; (3) performs a ray-ray intersection algorithm that determines intersection points where the incident rays and the camera rays intersect; and (4) performs a 3-D reconstruction algorithm that uses the set of incident rays, the set of camera rays and the intersection points to reconstruct a 3-D point cloud of the target object.

18 Claims, 13 Drawing Sheets

Top View

Related U.S. Application Data

(60) Provisional application No. 62/847,788, filed on May 14, 2019.

(51) Int. Cl.
  *H04N 13/207* (2018.01)
  *H04N 13/254* (2018.01)

(58) Field of Classification Search
  CPC ....... G02F 1/1336; G01B 11/25; G06T 17/00; H04N 13/254; H04N 13/207
  See application file for complete search history.

(56) References Cited

U.S. PATENT DOCUMENTS

| | | | |
|---|---|---|---|
| 7,948,514 | B2 | 5/2011 | Sato et al. |
| 8,165,403 | B1 | 4/2012 | Ramalingam et al. |
| 8,229,242 | B2 | 7/2012 | Veeraraghavan et al. |
| 8,437,537 | B2 | 5/2013 | Chang et al. |
| 9,958,259 | B2 | 5/2018 | Tin et al. |
| 10,168,146 | B2 | 1/2019 | Tin et al. |
| 11,671,580 | B2 * | 6/2023 | Ye .......................... G02F 1/0136 349/96 |
| 2014/0111845 | A1 * | 4/2014 | Zhou ..................... G02F 1/0136 359/252 |
| 2014/0268160 | A1 | 9/2014 | Debevec et al. |
| 2017/0178390 | A1 * | 6/2017 | Ye .......................... G06T 7/521 |

OTHER PUBLICATIONS

Weinmann, et al., "Multi-view normal field integration for 3d reconstruction of mirroring objects", Dec. 2013 IEEE International Conference on Computer Vision.

K. Ikeuchi, "Determining surface orientations of specular surfaces by using the photometric stereo method", IEEE Transactions on Pattern Analysis and Machine Intelligence, vol. PAMI-3, Issue 6, Nov. 1981.

Tarini, et al., "3D acquisition of mirroring objects using striped patterns", Science Direct, Graphical Models 67 (2005) 233-259.

Anman, et al., "Polarization fields: dynamic light field display using multi-layer LCDs", Association for Computing Machinery (ACM), In Proceedings of the 2011 SIGGRAPH Asia Conference (SA '11). ACM, New York, NY, USA, Article 186.

Rahmann, et al., "Reconstruction of specular surfaces using polarization imaging"., 2001 IEEE Computer Society Conference on Computer Vision and Pattern Recognition, CVPR Dec. 8-14, 2001.

Jacquet, et al., "Real-world normal map capture for nearly flat reflective surface", 2013 IEEE International Conference on Computer Vision, Dec. 2013.

Roth, et al., "Specular flow and the recovery of surface structure", 2006 IEEE Computer Society Conference on Computer Vision and Pattern Recognition (CVPR'06), Jun. 17-22, 2006.

Godard, et al., "Multi-view reconstruction of highly specular surfaces in uncontrolled environments" International Conference on 3D Vision | 3DV 2015, Oct. 2015.

Liu, et al., "Specular surface recovery from reflections of a planar pattern undergoing an unknown pure translation", Asian Conference on Computer Vision, ACCV 2010, Nov. 2010.

Miyazaki, et al., "Polarization-based surface normal estimation of black specular objects from multiple viewpoints", 2012 Second International Conference on 3D Imaging, Modeling, Processing, Visualization & Transmission, Oct. 2012.

Morel, et al., "Polarization imaging applied to 3d reconstruction of specular metallic surfaces", Proceedings vol. 5679, Machine Vision Applications in Industrial Inspection XIII, Feb. 2005.

Bonfort, et al., "Voxel carving for specular surfaces" Proceedings Nineth IEEE International Conference on Computer Vision, Oct. 2003.

Balzer, et al., "Multiview specular stereo reconstruction of large mirror surfaces", IEEE Computer Society Conference on Computer Vision and Pattern Recognition, IEEE Computer Society Conference, Jun. 2011.

\* cited by examiner

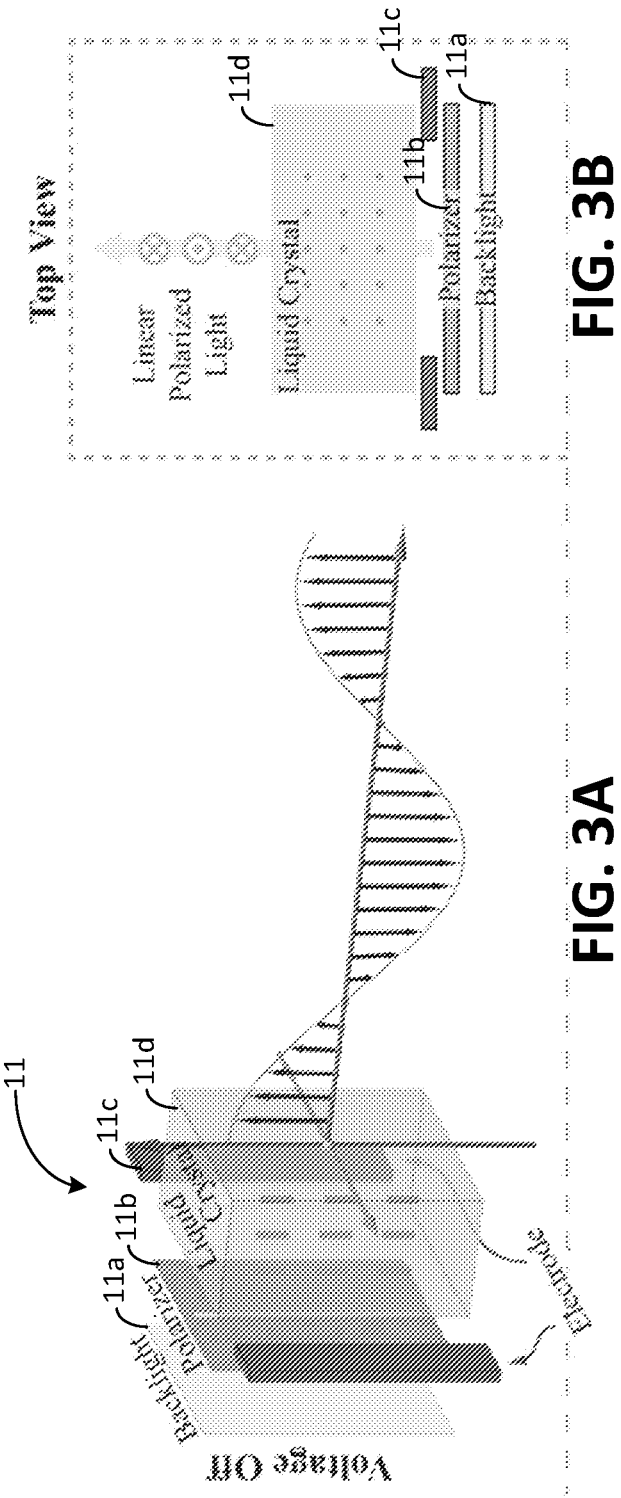

SYSTEM AND METHOD FOR RECONSTRUCTING 3-D SHAPES OF OBJECTS FROM REFLECTION IMAGE

CROSS-REFERENCE TO RELATED APPLICATIONS

This application is a continuation claiming priority to, and the benefit of, U.S. nonprovisional application Ser. No. 16/874,632, filed May 14, 2020, which claims priority to, and the benefit of, U.S. provisional application No. 62/847,788, filed on May 14, 2019, entitled "SYSTEM AND METHOD FOR RECONSTRUCTING IMAGES OF OBJECTS," both of which are incorporated herein by reference in their entireties.

TECHNICAL FIELD

The present disclosure is generally related to reconstructing three-dimensional (3-D) shapes of objects, including, but not limited to, objects having surfaces that are notoriously difficult to reconstruct, such as mirror surfaces, for example.

BACKGROUND

Mirror surfaces are difficult to reconstruct because their appearances are "borrowed" from the surrounding environment and therefore can be regarded as "invisible." Most well-established 3-D reconstruction techniques (e.g., multi-view stereo, shape from shading, structured light, etc.) are not directly applicable to this task. However, successful reconstruction of such surfaces can benefit many applications, such as manufacturing, material inspection, robotics, art digitalization and preservation, etc.

Existing solutions for mirror surface reconstruction often place an illuminant with a known pattern near the mirror surface and use a camera looking towards the surface to capture the reflection images. By analyzing the correspondences between the reflection image and the known pattern, ray paths from the illuminant to the camera are triangulated to recover the surface geometry (e.g., depth or normal field). However, correspondences between image pixels and pattern points are under-constrained because knowing a point on a ray is insufficient to determine its path: the ray's direction also needs to be known. In order to determine the ray direction, existing solutions use multiple viewpoints or a moving illuminant to acquire multiple points on the path. Otherwise, additional geometry constraints such as planarity assumption, smoothness prior, and surface integrability constraint need to be assumed.

Early reconstruction approaches investigated distortions in reflection images for recovering the shape of specular objects. Conceptually, specular distortions are combined results of the specular object geometry and the surrounding environment. Given a known pattern in the environment, the object shape can be inferred consequently. Psychophysic studies indicate that specular distortion is an important visual cue for human vision to perceive the shape of a specular object. In computer vision, various patterns, such as grids, checkers, stripes, and lines are adopted for studying the specular distortion. Caustic distortion caused by mirror reflection is examined for geometry inference. Although local surface geometry properties such as orientations and curvatures can be recovered from specular distortions, the overall 3-D geometric model still remains ambiguous (e.g., the concave vs. convex ambiguity) and additional surface constraints such as near-flat surface and integrability need to be applied to resolve ambiguities.

Some approaches exploit the motion of specular reflections, or specular flow, for shape reconstruction. Usually, the specular flow is generated by a moving light source or camera. Alternatively, an array of cameras or light sources can be used. Then, feature correspondences among the specular flow are analyzed for 3-D reconstruction. Instead of using a spotlight, features in uncontrolled environment can be used for estimating the specular flow. One approach generalizes invariant features in specular reflection for correspondence matching. Another approach uses the specular flow to refine a rough geometry obtained from space carving. This class of approaches usually rely on a known motion of the object, the environment, or the camera, respectively. Furthermore, due to the reflection distortions, it is non-trivial to observe dense specular flow. One approach proposes sparse specular flow but the reconstructed surface is assumed quadratic. Therefore, this class of methods are not suitable to handle objects with complex shapes that cause severe distorted reflections.

Another class of approaches directly recover the incident and reflected rays on the specular surface and use ray-ray triangulation to recover the 3-D geometry. Often coded patterns (e.g., the Gray Code or phase shifting patterns) are laid out on the mirror surface. By establishing correspondences between image pixels and pattern points, the surface is reconstructed by triangulating the incident rays with reflected rays. Since a ray is uniquely determined by at least two points, multiple viewpoints or a moving pattern are commonly used to locate multiple points on the ray path. Some approaches use additional constraints, such as radiometric cues or frequency domain correspondences to determine the incident ray from one point on the path.

Shape from polarization is a popular class of 3-D reconstruction techniques that estimates surface shape from the polarization state of reflected light. In a common setup, a polarizer is mounted in front of the camera and multiple images are captured under different polarization angles. Then, by fitting the phase function with captured intensities, the azimuth angle of surface normal can be estimated. However, due to symmetry of the cosine function, the azimuth angle has the w-ambiguity: flipping the surface by w results in the same polarization measurements. To resolve this ambiguity, additional assumptions, such as shape convexity and boundary normal prior need to be made. Some approaches combine the polarization cue with other photometric cues, such as shape-from-shading, photometric stereo, or multi-spectral measurements to disambiguate the normal estimation. A recent trend is to use shape from polarization to recover fine details on top of a coarse geometry. Multi-view stereo, space carving, structure from motion or RGB-D sensors can be used to initiate the coarse geometry.

A need exists for a system and method for performing image reconstruction that overcome the disadvantages of the existing approaches.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 3A and 3B show perspective and top views, respectively, of an NB IPS device with its liquid crystals in the off state.

DETAILED DESCRIPTION

Figures 1A, 1B:
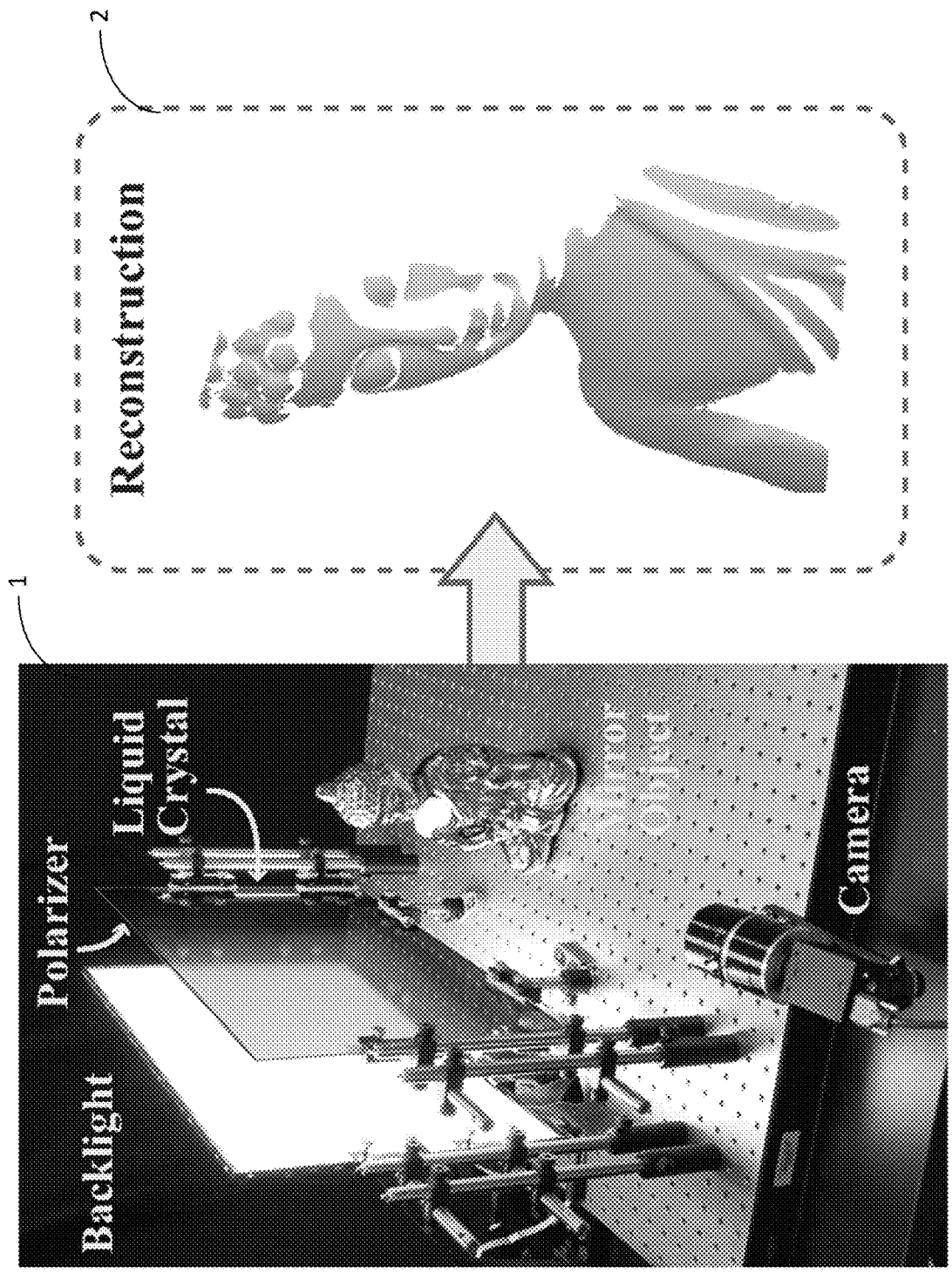
FIG. 1A is a photograph of an experimental setup of the system for surface reconstruction in accordance with a representative embodiment in which a commercially-available liquid crystal display (LCD) device with the top polarizer removed comprises the polarization field generator of the system.
FIG. 1B shows a reconstructed mirror surface produced by the system shown in FIG. 1A.

The present disclosure discloses representative, or exemplary, embodiments of a system and method for reconstructing 3-D point cloud that overcome the disadvantages of the aforementioned known approaches. A light source of the system generates light that is received by a polarization field generator of the system. The polarization field generator generates a polarization field that illuminates the target object being imaged such that each outgoing ray has a unique polarization state. A camera of the system captures images of the illuminated target object. The captured images are received by a processor of the system that: (1) performs a polarization field decoding algorithm that decodes the polarization field to obtain a set of incident rays; (2) performs a camera ray decoding algorithm to obtain a set of camera rays; (3) performs a ray-ray intersection algorithm that determines intersection points where the incident rays and the camera rays intersect; and (4) performs a 3-D reconstruction algorithm that uses the set of incident rays, the set of camera rays and the intersection points to reconstruct a 3-D point cloud of the target object.

In the following detailed description, for purposes of explanation and not limitation, exemplary, or representative, embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

FIG. 1A is a photograph of an experimental setup 1 of the system for mirror surface reconstruction in accordance with a representative embodiment. In accordance with this embodiment, a commercially-available liquid crystal display (LCD) device with the top polarizer removed comprises the polarization field generator that generates the polarization field. A backlight of the LCD device is used as the light source. A camera of the system captures images of the target object, shown in FIG. 1A as the "Mirror Object," as it is illuminated by the polarization field generated by the LCD polarizer panel. FIG. 1B shows the reconstructed mirror surface 2 produced by the system. It should be noted that although the representative embodiments are being described with reference to a mirror object or objects that have mirror surfaces, this is only to demonstrate the ability of the system to reconstruct images of objects that are notoriously difficult to reconstruct. The system and method may be used to reconstruct images of any type of object or surface. It should also be noted that the system and method are not limited to the experimental setup shown in FIG. 1A, as will be understood by those of skill in the art in view of the description provided herein.

In this disclosure, a computational imaging approach is presented for reconstructing complex mirror surfaces using a pair of LCD and viewing camera, as discussed above with reference to FIGS. 1A and 1B. This approach exploits the polarization rotation properties of liquid crystals and removes the top polarizer of an LCD device to create a polarization field, in which each outgoing ray has a unique polarization state. While it is known to stack multiple liquid crystal layers and use the polarization field to implement an autostereoscopic display that produces view-dependent images, the approach described herein instead takes advantage of the angular information embedded in the polarization field for reconstructing mirror surfaces. In accordance with an embodiment, to characterize the polarization states with respect to ray directions, the polarization rotation induced by liquid crystals is modeled using Jones calculus to demonstrate that the outgoing rays are elliptically polarized when voltage is applied to the liquid crystals. In particular, the ellipse's orientation (i.e., directions of major and minor axes) is associated with ray direction and the ellipticity (i.e., the ratio between major and minor axes) depends on the applied voltage (or the input intensity to LCD). Since polarized light has a different reflection rate when it interacts with the mirror surface, the polarization field exhibits various intensities in the reflection image.

To model reflection under the polarization field, a reflection image formation model is derived using Fresnel's equations that describe the reflection and transmission of light as an electromagnetic wave when incident on an interface between different media. The incident ray directions are then optimized from the captured reflection images. By taking into consideration the combined intensity for polarized light in the reflection image model, the need to use a rotating polarizer during image acquisition is eliminated. In accordance with a preferred embodiment, to estimate the incident rays, their positions are first decoded using Gray Code and then their directions are optimized by applying the reflection image formation model. Then, the incident rays and camera rays are triangulated to obtain the surface normals and recover the 3-D surface by Poisson integration. As discussed below, comprehensive experiments have been performed on both simulated and real surfaces to demonstrate that the approach disclosed herein is capable of recovering a broad range of complex surfaces with high fidelity.

I. OVERVIEW

Figure 2:
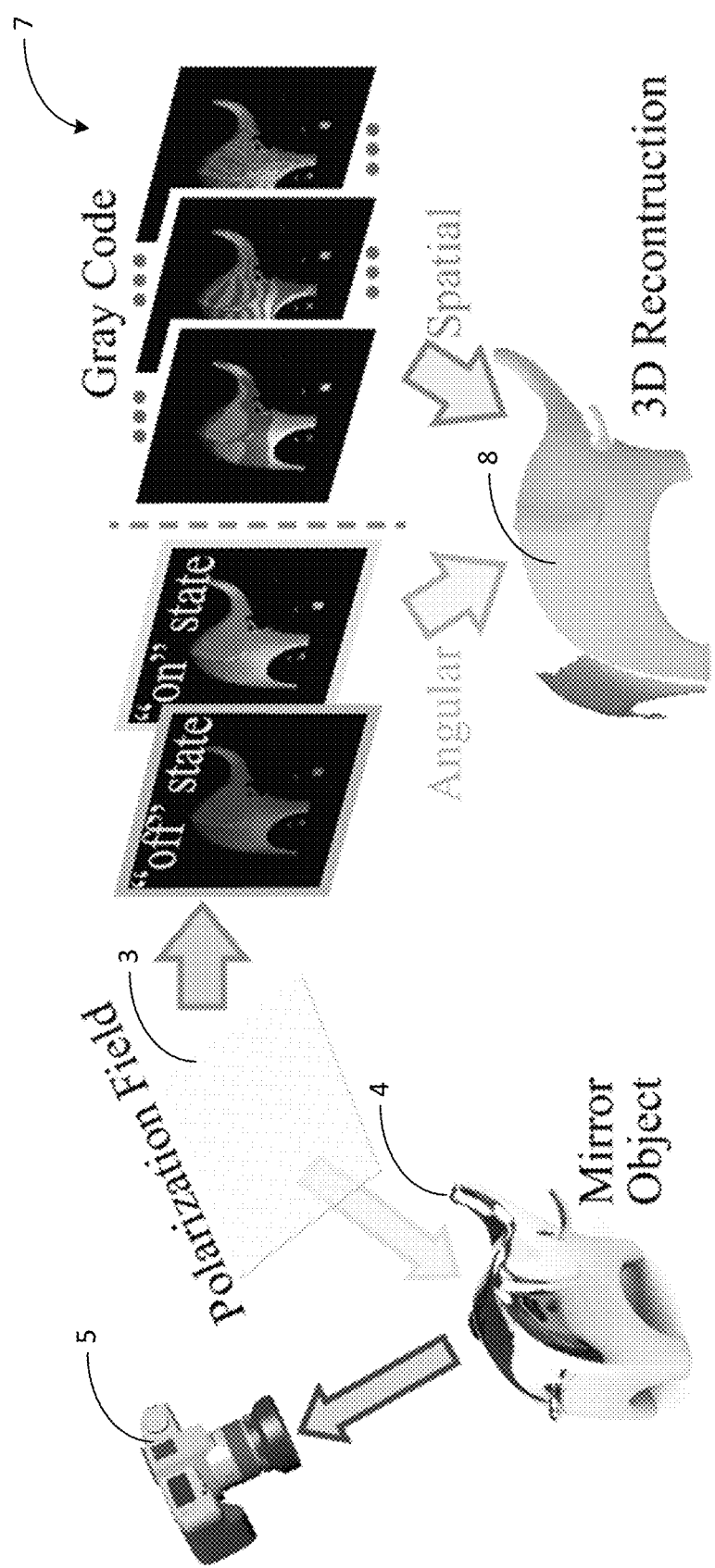
FIG. 2 shows an overview of the reconstruction approach using the polarization field in accordance with a representative embodiment.

FIG. 2 shows an overview of the mirror surface reconstruction approach that uses the polarization field in accordance with a representative embodiment. As indicated above, the top polarizer of an LCD 3 is removed to generate the polarization field that illuminates the surface of a mirror object 4. An acquisition camera 5 captures the reflection images under the polarization field. As indicated above, the acquisition camera 5 does not need to use a rotating polarizer, as this approach takes into consideration combined intensity in the reflection image formation model. A sequence of Gray Code images 7 are obtained, including all black (i.e., "off" state) and all white (i.e., "on" state) for estimating the incident rays. The Gray Code images are decoded to obtain originating LCD pixels for each captured incident ray and then the ray directions are optimized by applying the reflection image formation model, which characterizes the reflected intensities for different polarization states. The incident rays and camera rays are triangulated to obtain the surface normals and recover the 3-D surface 8 by Poisson integration.

II. POLARIZATION FIELD

This section describes how to generate the polarization field with a commercial LCD. First, the working principles of LCDs are reviewed and the polarization of outgoing rays is modeled using Jones calculus. Then, the polarization with respect to the outgoing ray directions is analyzed to show that the polarization states encode angular information.

A. LCD Polarization Analysis

A typical LCD device is composed of a uniform backlight and a liquid crystal layer controlled by electrodes and sandwiched between two crossed linear polarizers. By controlling the voltage applied across the liquid crystal layer in each pixel, the liquid crystals alter orientations and rotate the polarization of outgoing rays. This results in varying amounts of light passing through the polarizer and thus constitute different levels of gray. Since the top polarizer regulates the polarization states to align with itself, the system disclosed herein eliminates the top polarizer to allow the outgoing rays to carry different polarization states modulated by the liquid crystals and thus generate the polarization field. In the experiment discussed herein, a normal black (NB) in-plane switch (IPS) LCD is used, in which the liquid crystals are homogeneous and rotated in multiple transverse planes.

Figures 3C, 3D:
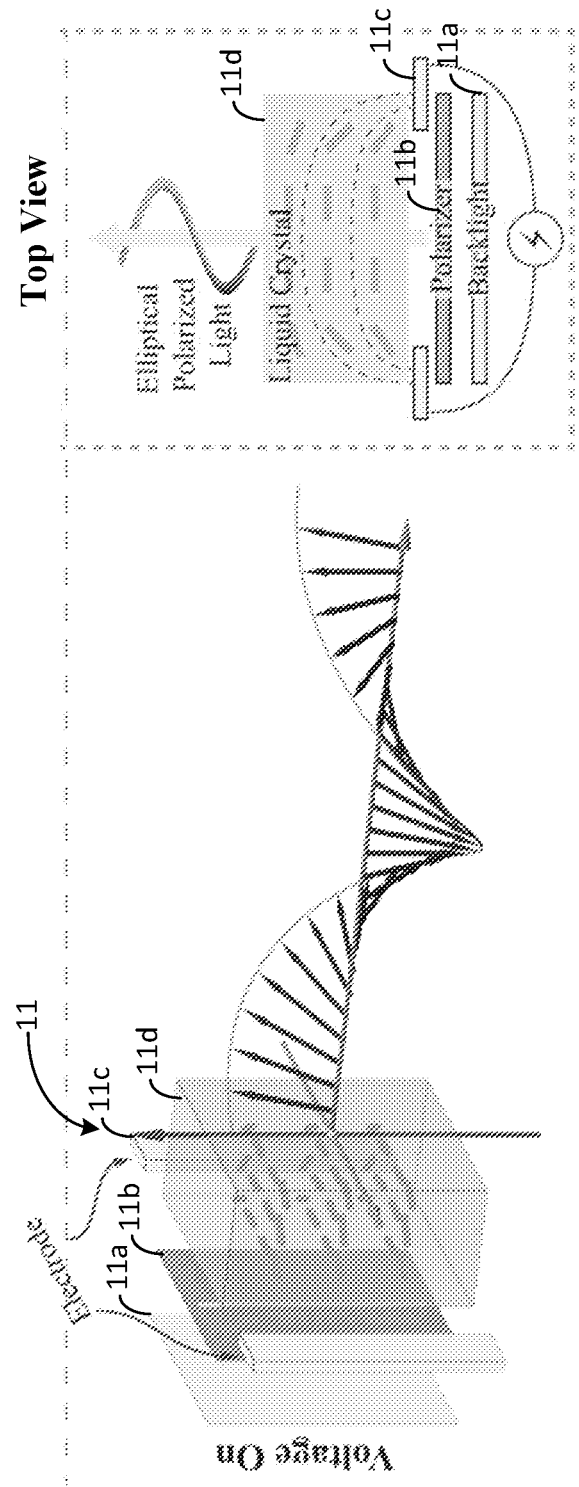
FIGS. 3C and 3D show perspective and top views, respectively, of an NB IPS device with the liquid crystals in the on state.

FIGS. 3A-3D show how the liquid crystals in an NB IPS device 11 alter polarization states of outgoing rays with/without voltage applied. FIGS. 3A and 3B show perspective and top views, respectively, of the NB IPS device 11 with the liquid crystals in the off state. FIGS. 3C and 3D show perspective and top views, respectively, of the NB IPS device 11 with the liquid crystals in the on state. The unpolarized light emitted from the uniform backlight 11a is first linearly polarized by the polarizer 11b. After being modulated by the liquid crystals 11d, the light may exhibit two different types of polarization: linear or elliptical. When no voltage is applied, as in FIGS. 3A and 3B, the liquid crystals 11d are all aligned with the first polarizer (vertical) 11b. As result, the polarization states of light passing through is not rotated and remains linearly polarized (aligned with the first polarizer 11b). When voltage of the electrodes 11c is on, the liquid crystals 11d rotate in plane as a response and cause polarization rotation for light passing through. In the following, it is shown that the outgoing rays are generally elliptically polarized and the ellipse's orientation is related to the ray direction.

In accordance with a representative embodiment, Jones calculus is used to mathematically characterize the polarization states of outgoing rays emitted from the polarization field. In Jones calculus, polarized light is represented by Jones vector in terms of its complex amplitude and linear optical elements are represented as 2×2 Jones matrices. When light crosses an optical element, the resulting polarization of emerging light is found by taking the product of the Jones matrix of the optical element and the Jones vector of the incident light.

Figure 4:
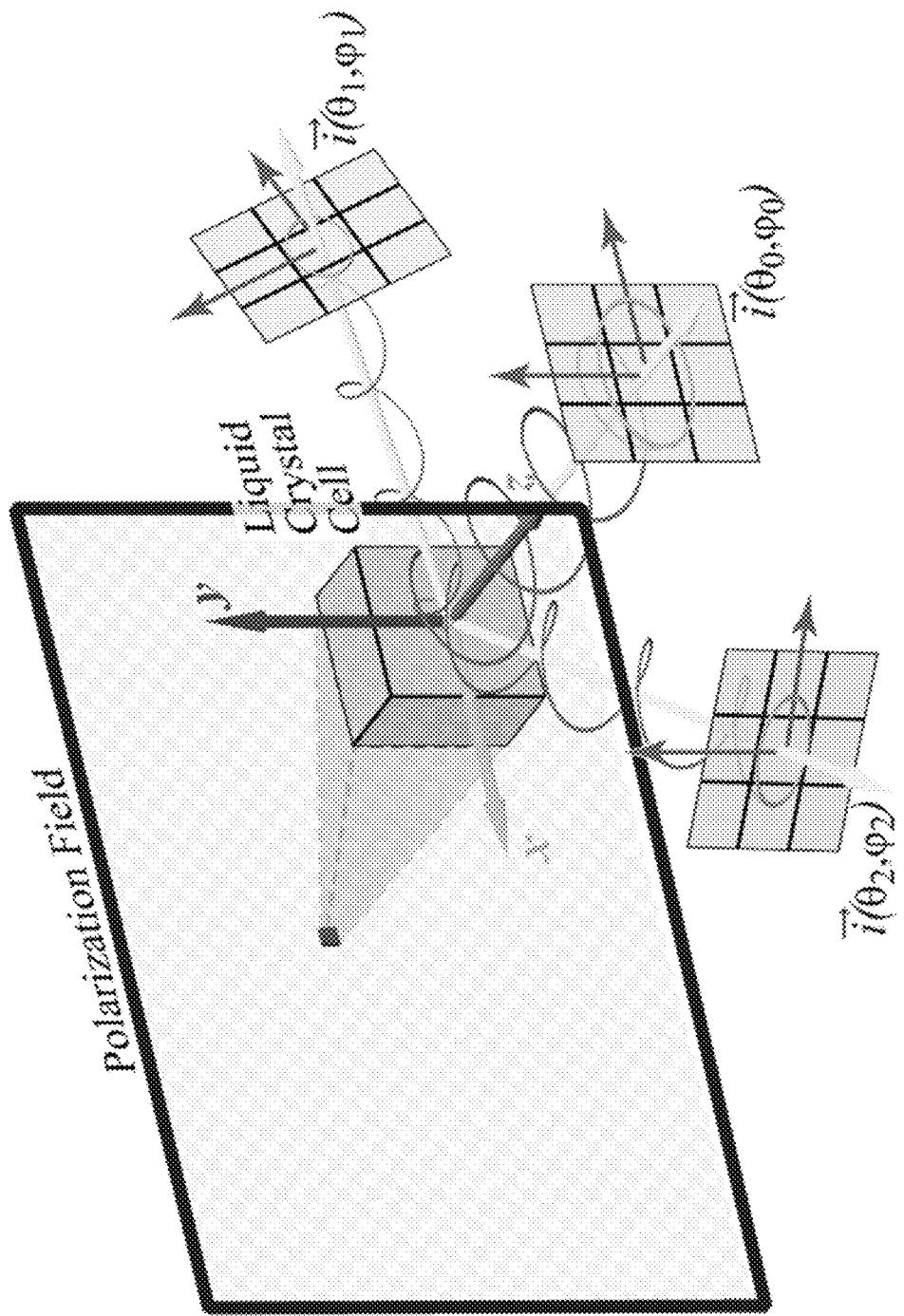
FIG. 4 shows outgoing rays from the polarization field that are elliptically polarized, with the ellipse's orientation being associated with the propagation direction.

FIG. 4 shows a coordinate system that is set up on a display plane. The light emitted from the unpolarized backlight 11a first passes through the polarizer 11b and becomes linearly polarized. In terms of Jones vector, the polarization of the linearly polarized light can be written as:

$$V = \begin{bmatrix} V_x \\ V_y \end{bmatrix} = \begin{bmatrix} \cos\omega \\ \sin\omega \end{bmatrix} \tag{1}$$

where ω defines the orientation of the linear polarizer. For a vertical polarizer, ω=π/2. When voltage is applied on the electrodes 11c, the liquid crystals 11d within a cell rotate on multiple transverse planes in the IPS mode. Assume a cell is decomposed into N transverse planes with in-plane rotated liquid crystals. Each plane can be considered as a homogeneous wave plate since the liquid crystals rotate uniformly and the Jones matrix can be written as:

$$W_i(\Psi_i) = \begin{bmatrix} e^{-\frac{i\pi}{2N}}\cos^2\Psi_i + e^{\frac{i\pi}{2N}}\sin^2\Psi_i & -i\sin\left(\frac{\pi}{2N}\right)\sin(2\Psi_i) \\ -i\sin\left(\frac{\pi}{2N}\right)\sin(2\Psi_i) & e^{-\frac{i\pi}{2N}}\sin^2\Psi_i + e^{\frac{i\pi}{2N}}\cos^2\Psi_i \end{bmatrix} \tag{2}$$

where $i \in [1,N]$ is the index of transverse plane and $\Psi_i$ is the angle of rotation for liquid crystals on the $i^{th}$ plane. By multiplying the Jones matrices (Eq. 2). of all transverse planes with the Jones vector of the linearly polarized light (Eq. 1), we obtain the polarization of the emitted light as:

$$V' = \Pi_{i=1}^{N} W_i(\Psi_i) V \tag{3}$$

Since V' is composed of complex numbers, the outgoing rays are elliptically polarized and the polarization state is determined by the applied voltage (or the input intensity to LCD) and the ray direction. Specifically, the voltage defines the ellipticity (i.e., ratio between major and minor axes) and the outgoing ray direction determines the ellipse's orientation (i.e., directions of major and minor axes) because the voltage controls the rotation angle of liquid crystals (i.e., $\Psi_i$) and the ellipse plane is normal to the ray propagation direction.

B. Angularly Varying Polarization States

Next, the polarization states of outgoing rays with respect to their propagation directions are characterized. Since an elliptically polarized wave can be resolved into two linearly polarized waves along two orthogonal axes, the major and minor axes of the ellipse need to be found and the emitted light needs to be decomposed onto the two axes.

Given an outgoing ray emitted from the polarization field as $\vec{i}(\theta,\phi)$, where θ and φ are the zenith and azimuth angles, and given the elliptical plane is normal to the ray's propagation direction (see FIG. 4), the two orthogonal axes can be formulated by cross product:

$$\vec{d}_1 = \frac{\vec{y} \times \vec{i}(\theta,\phi)}{\|\vec{y} \times \vec{i}(\theta,\phi)\|} \tag{4}$$

$$\vec{d}_2 = \frac{\vec{d}_1 \times \vec{i}(\theta,\phi)}{\|\vec{d}_1 \times \vec{i}(\theta,\phi)\|}$$

where $\vec{y}$ is the y-axis and $\vec{i}(\theta,\phi)$ is the outgoing ray's propagation direction.

The elliptically polarized light along $\vec{i}(\theta,\phi)$ onto $\vec{d}_1$ and $\vec{d}_2$ can be decomposed as $\vec{E}_1$ and $\vec{E}_2$ and the amplitude ratio γ between the two decomposed waves can be defined as:

$$\gamma(\theta,\phi,v_k) = \frac{\|\vec{E}_1(v_k)\|}{\|\vec{E}_2(v_k)\|} = \sqrt{\frac{Id1(v_k)}{Id2(v_k)}} \tag{5}$$

where $v_k$ (k=0, . . . , 255, which refers to the input intensity) is the applied voltage; $I_{d_1}$ and $I_{d_2}$ are captured intensities by applying a polarizer along $d_1$ and $I_{d_2}$ on the acquisition camera, which models the energy of the decomposed waves. When the ray is normal to the display plane (θ=φ=0) the major and minor axes of the polarization ellipse are aligned with the x-axis and y-axis. The amplitude ratio after decomposition can be written as:

$$\gamma(0,0,v_k) = \frac{E_\Leftrightarrow(v_k)}{E_\Updownarrow(v_k)} = \sqrt{\frac{I_\Leftrightarrow(v_k)}{I_\Updownarrow(v_k)}} \tag{6}$$

where $E_\Leftrightarrow$ and $E_\Updownarrow$ denotes the decomposed waves; $I_\Leftrightarrow$ and $I_\Updownarrow$ are intensities captured by applying a horizontal and vertical polarizer.

Since the IPS LCD has very wide viewing angle, the amplitude ratios γ are almost the same for different viewing angles. We therefore use $\gamma(0,0,v_k)$ to approximate the ratio at arbitrary angles $\gamma(\theta,\phi,v_k)$. We also justify this approximation using experiments by capturing polarized intensity ratios from different viewing angles (see section II-B, above). The ratio γ is critical to determine the energy of decomposed waves, this approximation greatly simplifies the procedure for measuring γ: we only need to measure the ratio between the vertical and horizontal polarization images for each intensity level.

Assuming the elliptically polarized light energy is normalized to 1, the decomposed waves along $d_1$ and $d_2$ for ray $\vec{i}(\theta,\phi)$ can be written as:

$$\vec{E}_1(v_k) = \frac{\gamma(0,0,v_k)}{1+\gamma(0,0,v_k)} \cdot \vec{d}_1 \tag{7}$$

$$\vec{E}_2(v_k) = \frac{\gamma(0,0,v_k)}{1+\gamma(0,0,v_k)} \cdot \vec{d}_2$$

III. MIRROR SURFACE RECONSTRUCTION

In this section, we describe how to recover mirror surface using polarization field. We first derive a reflection image formation model under the polarization field since reflection alters the polarization of light. We show that the reflection image is a function of incident ray direction. We therefore optimize the incident ray directions from the captured reflection images. Finally, we triangulate the incident rays with reflected rays for surface reconstruction.

A. Reflection Image Formation

Figure 5:
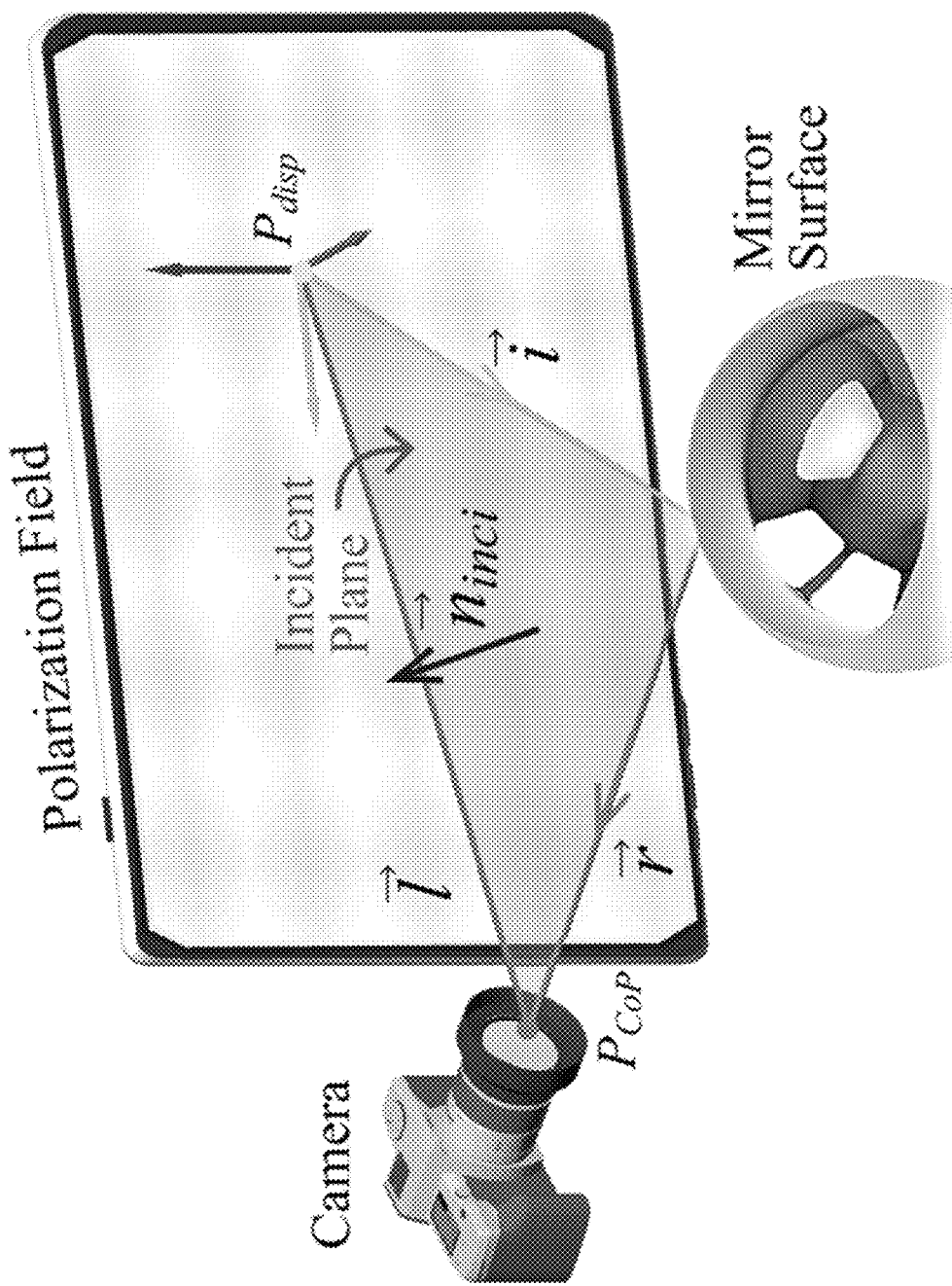
FIG. 5 shows an incident plane of reflection (formed by the incident ray and the reflected ray).

Assuming the viewing camera's center of projection (CoP) $P_{CoP}$ and camera rays (or reflected rays) $\vec{r}$ have been obtained from camera calibration and the pixel-point correspondence (between the captured image and displayed image) using Gray Code, an incident plane of reflection can be formed for each display pixel $P_{disp}$ as shown in FIG. 5. The normal of the incident plane can be derived as:

$$\vec{n}_{inci} = \frac{\vec{l} \times \vec{r}}{\|\vec{l} \times \vec{r}\|} \tag{8}$$

where $\vec{l} = P_{CoP} - P_{disp}$. Assume the surface point is at depth d, the surface point $P_{inter}$ can be written as:

$$P_{inter} = P_{CoP} - d \cdot \vec{r} \tag{9}$$

Given $P_{inter}$ and $P_{disp}$, the incident ray that emitted from the polarization field can be written as:

$$\vec{i} = P_{inter} - P_{disp} \tag{10}$$

Figure 6:
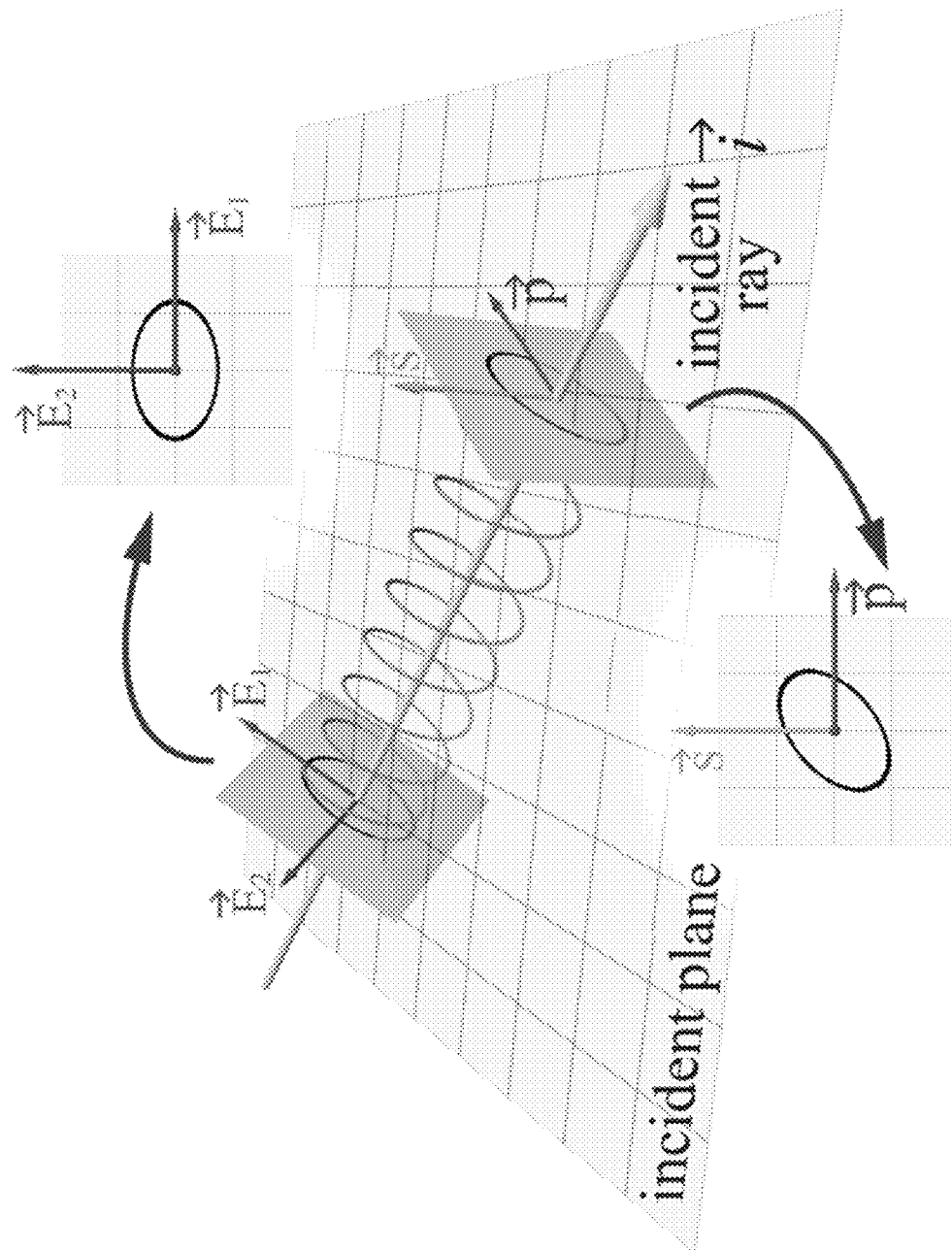
FIG. 6 is a diagram showing s- and p-polarization decomposition for an incident ray.

Eq. 10 indicates the incident ray is a function of surface depth. According to the reflection law, the incident ray $\vec{i}$ is always lying on the plane of incident. The polarization state of $\vec{i}$ can then be decomposed into two orthogonal linear polarizations: p-polarized component $\vec{p}$, whose polarization direction is lying in the incident plane, and s-polarized component $\vec{s}$, whose polarization direction is perpendicular to the incident plane. This is shown in FIG. 6, which is a diagram showing s- and p-polarization decomposition for an incident ray.

Recalling that a ray emitted from the polarization field onto two orthogonal axes $d_1$ and $d_2$ has been decomposed above as and $\vec{E}_1$ and $\vec{E}_2$, the s- and p-polarization decomposition for $\vec{E}_1$ and $\vec{E}_2$ can be performed separately as:

$$\vec{s}_1 = (\vec{E}_1 \cdot \vec{n}_{inci}) \vec{n}_{inci}$$

$$\vec{s}_2 = (\vec{E}_2 \cdot \vec{n}_{inci}) \vec{n}_{inci} \tag{11}$$

And $$\vec{p}_1 = \vec{E}_1 - \vec{s}_1$$

$$\vec{p}_2 = \vec{E}_2 - \vec{s}_2 \tag{12}$$

Superposition of $\vec{s}_1$ with $\vec{s}_2$ and $\vec{p}_1$ with $\vec{p}_2$ obtains the s- and p-polarized component of incident ray $\vec{i}$. Assume the phase difference between the s-polarized wave s and p-polarized wave p is $\delta$ (which is the same as the phase difference between $\vec{E}_1$ and $\vec{E}_2$). The amplitudes of the superposed waves for s and p-polarized components can be written as:

$$s = \sqrt{(\|\vec{s}_1\|^2 + \|\vec{s}_2\|^2 + 2\|\vec{s}_1\|\|\vec{s}_2\|\cos(\delta))}$$

$$p = \sqrt{(\|\vec{p}_1\|^2 + \|\vec{p}_2\|^2 + 2\|\vec{p}_1\|\|\vec{p}_2\|\cos(\delta))} \tag{13}$$

Given the incident ray $\vec{i}$ and reflected ray $\vec{r}$, the reflection angle $\beta_i$ can be written as:

$$\beta_i = \frac{1}{2} \cdot \arccos\left(\frac{(-\vec{i}) \cdot \vec{r}}{\|(-\vec{i}) \cdot \vec{r}\|}\right) \tag{14}$$

Figure 7:
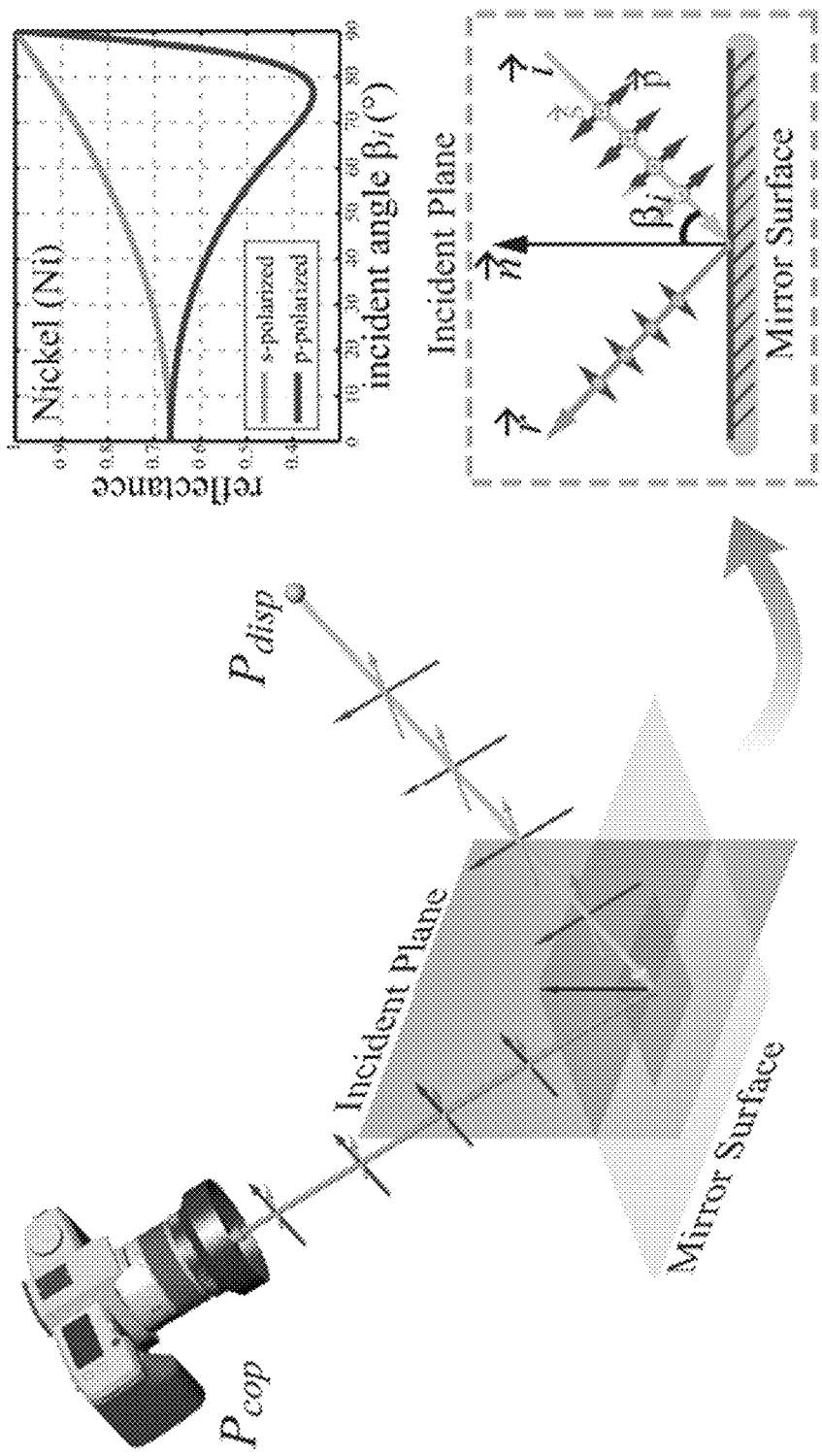
FIG. 7 shows that the reflection rate is related to the polarization states, incident angle, and surface material (i.e., the refractive index).

FIG. 7 illustrates the relationship between the reflection rate of light, the polarization state, the incident angle, and the surface material (i.e., the refractive index). According to the Fresnel equations, the reflection rate of light is related to the polarization state, incident angle, and surface material (i.e., the refractive index). The p-polarized light and s-polarized light have different reflectance coefficients.

In particular, for $\vec{i}$, the strength of reflection or the reflectance coefficients of its p- and s-polarized components can be written as:

$$R_p(\beta_i, n_m) = \left|\frac{n_{air}\sqrt{1 - \left(\frac{n_{air}}{n_m}\sin\beta_i\right)^2} - n_m \cos\beta_i}{n_{air}\sqrt{1 - \left(\frac{n_{air}}{n_m}\sin\beta_i\right)^2} + n_m \cos\beta_i}\right|^2 \tag{15}$$

$$R_s(\beta_i, n_m) = \left|\frac{n_{air}\cos\beta_i - n_m\sqrt{1 - \left(\frac{n_{air}}{n_m}\sin\beta_i\right)^2}}{n_{air}\cos\beta_i + n_m\sqrt{1 - \left(\frac{n_{air}}{n_m}\sin\beta_i\right)^2}}\right|^2$$

where $n_{air}$ is the refractive index of air (which can be approximated as one) and $n_m$ is the refractive index of the surface, which is related to the surface material. It is worth noting that refractive indices of metal materials are complex numbers, which not only affect the relative amplitude, but also the phase shifts between p- and s-polarized components.

The amplitudes of p- and s-components of the reflection ray $\vec{r}$ can then be computed as $\|R_s\|_s$ and $\|R_p\|_p$. Therefore, the intensity of the reflection image can be obtained by combining the amplitude of s- and p-components of $\vec{r}$ because the intensity of a light is always the sum of intensities along two orthogonal directions of the light:

$$I(v_k) = \epsilon((\|R_p\|p)^2 + (\|R_s\|s)^2) \tag{16}$$

where $\epsilon$ is a scale factor that considers the absolute energy from the unpolarized backlight. Eq. 16 models the reflection image under the polarization field with respect to the incident ray direction. Assume we know the refractive index $n_m$ of the mirror surface. By capturing two reflection images $\hat{I}(v_k)$ at k=0 ($\delta$=0) and k=255 ($\delta$=$\pi$/2), we can estimate the incident ray direction i and scale factor e using the following objective function:

$$\arg\min_{\vec{i},\epsilon} \sum^{k=0.255} \|\hat{I}(v_k) - I(v_k)\|^2 \tag{17}$$

Eq. 17 can be solved by an iterative optimization using non-linear least square. In our implementation, we use the trust region reflective optimization algorithm, which is a Newton Step-based method that exhibits quadratical speed of convergence near the optimal value.

B. Ray-Ray Triangulation

After the incident rays $\vec{i}$ have been obtained, they can be triangulated with the camera rays $\vec{r}$ to recover the mirror surface. Specifically, the surface normal is estimated by taking the half way vector between $\vec{i}$ and $\vec{r}$ as:

$$\vec{n} = \frac{\vec{r} - \vec{i}}{\|\vec{r} - \vec{i}\|} \quad (18)$$

The normal field can then be integrated using the Poisson method to recover the 3-D surface. In particular, the surface can be modeled as a height field h(x,y), and the normal vector can be represented at each point (x,y) using horizontal and vertical gradients as $(h_x, h_y, -1)$. When given the boundary condition and the normal field, the problem of normal field integration to recover the 3-D surface can be formulated to find the optimal surface z where:

$$\min_z \int\int \left((z_x - h_x)^2 + (z_y - h_y)^2\right) dx dy \quad (19)$$

Solving this optimization problem is equivalent to solving the Poisson equation: $\Delta z = h_{xx} + h_{yy}$, where $\Delta$ is the Laplacian operator: $\Delta = \partial^2/\partial x^2 + \partial^2/\partial y^2$.

IV. EXPERIMENTS

In this section, the approach described above is validated on simulated and real surfaces. All experiments are performed on a PC with Intel i5-8600K CPU (6-Core 4.3 GHz) and 16 G memory using Matlab.

A. Simulated Experiments

Figure 8:
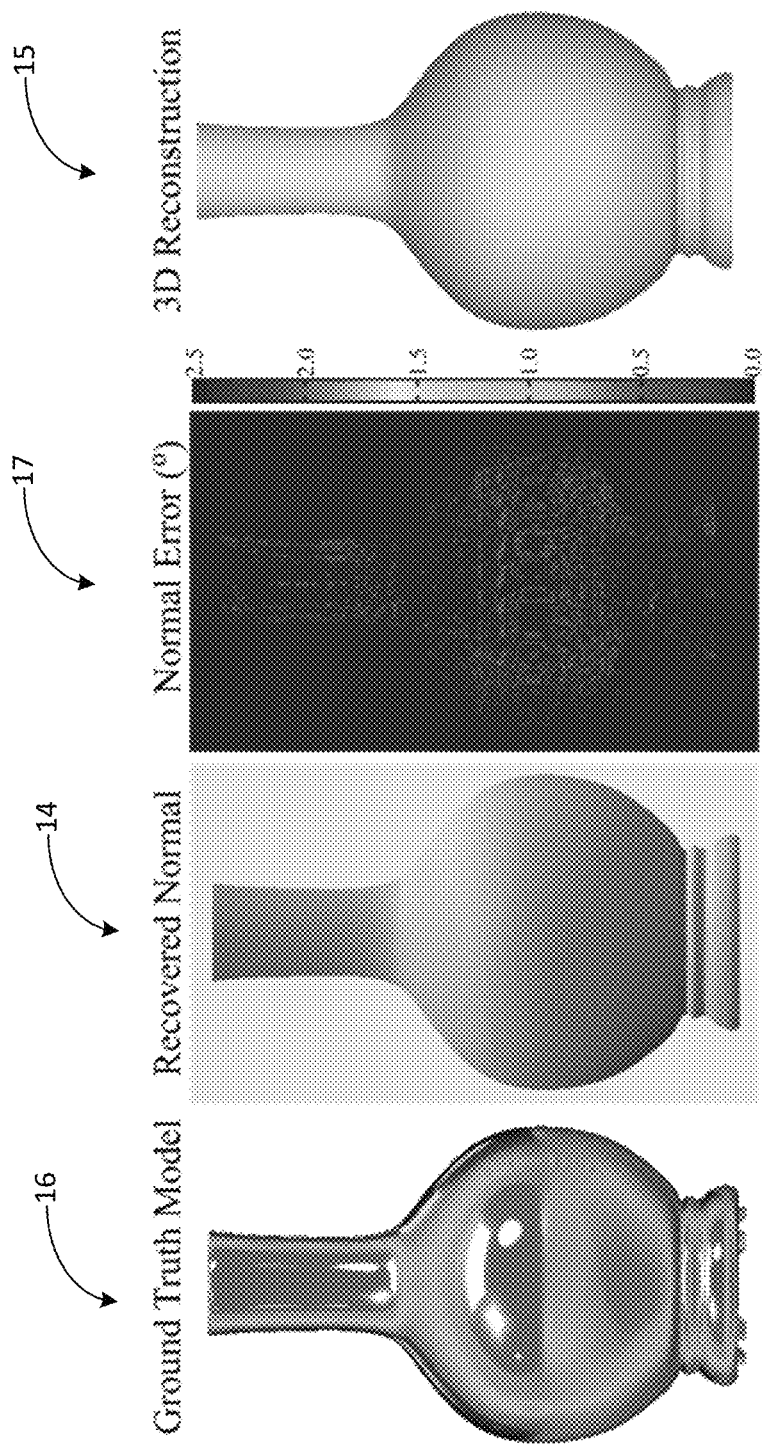
FIG. 8 shows simulation experiment results on a vase model using the system and method in accordance with a representative embodiment.

FIG. 8 shows the simulation experiment results on a vase model. A ray tracer is implemented to render the reflection images of polarization field based on the reflection image formation model described above.

In the simulation, a display with resolution of 1920×1920 and a vase model within a volume of 600×300×300 were used. The refractive index of silver (Ag), $n_m=0.16+3.93i$, was used for the vase surface. A perspective viewing camera with field of view 90° and resolution 1920×1080 was used as the acquisition camera. First, pixel-point correspondences between the image and display were established by decoding a series of Gray Code reflection images. Two reflection images were then rendered by displaying gray level k=0 and k=255 for estimating the incident ray direction. By triangulating the incident rays and camera rays, the surface normal map 14 was recovered and then the 3-D surface 15 was recovered using Poisson integration. The reconstructed normal map 14 was compared with a ground truth model 16 to obtain the normal error map 17. The Root Mean Square (RMS) error of normal angles is 0.1481°. This experiment demonstrates that the approach described above produces highly accurate reconstruction.

B. Real Experiments

Real experiments were performed on various complex mirror objects using the experimental setup for the system shown in FIG. 1A to validate the approach described above. To generate the polarization field, a commercial IPS LCD monitor (Dell E2417H) with its top polarizer removed with acetone was used. A monochrome camera (PointGray GS3-U3-51S5M-C) with a resolution of 2448×2048 and focal length 50 mm was used for capturing the reflection images of the polarization field from the mirror surface.

The system shown in FIG. 1A was first calibrated to establish a common coordinate for the display and the camera. Since the camera cannot cover the display in its field of view, an auxiliary camera was also to bridge the viewing camera and the display. The auxiliary camera is directly looking towards the display and shares a common field of view with the viewing camera. A linear polarizer is mounted in the front to capture the displayed checkerboard as the top polarizer of the LCD has been removed. Then the auxiliary camera and viewing camera are co-calibrated by checkerboard within the common view.

Figure 9:
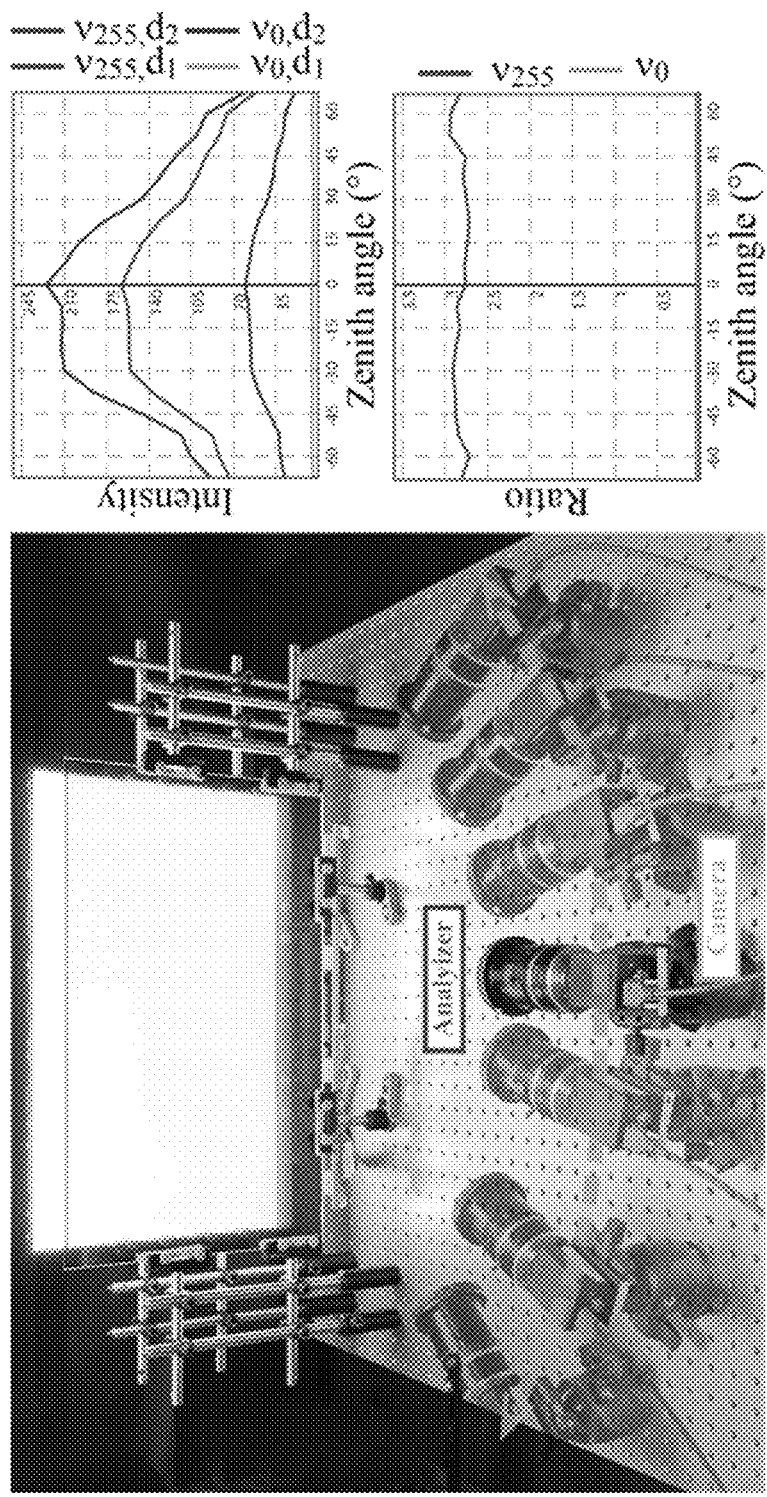
FIG. 9 shows an experimental setup for validation in which a camera looks towards the display from different viewing angles and a linear polarizer is disposed in front of the camera to capture horizontally and vertically polarized images; this experiment demonstrates that $\gamma(0,0,v_k)$ can be used to approximate $\gamma(\theta,\phi,v_k)$ of arbitrary ray directions for the same intensity level k.

Experiments were also performed to validate that the amplitude ratios γ are almost the same for different viewing angles. As shown in FIG. 9, a camera looking towards the display from different viewing angles (ranging from with a step of 7°) was used for this purpose. A linear polarizer (a.k.a analyzer) is attached in front of the camera to capture horizontally and vertically polarized images. For each viewing angle, images were captured of gray level 255 and 0. The ratio between intensities captured at $d_1$ and $d_2$ was computed and the curves for both intensities and ratios were plotted at different viewing angles (see FIG. 9). This experiment demonstrates that $\gamma(0,0,v_k)$ can be used to approximate $\gamma(\theta,\phi,v_k)$ of arbitrary ray directions for the same intensity level k. It should be noted that $\gamma(0,0,v_0)$ and $\gamma(0,0,v_{255})$ are used in the optimization (Eq. 17) for estimating the incident ray.

In order to obtain the incident plane, the origins of incident rays are first determined. Gray Code was used to establish pixel-point correspondences and to decode ray positions. Since the display has a resolution of 1920×1080, 22 patterns were used to resolve all pixels. Since the captured intensity varies with polarization states and surface geometry, the captured reflection images can be compared with the all-white and all-black images to robustly decode the Gray Code. After the ray positions $P_{disp}$, have been obtained, the reflection image formation model can be applied to estimate the incident ray directions. Finally, the incident rays are triangulated with the reflected rays for surface reconstruction.

Figure 10:
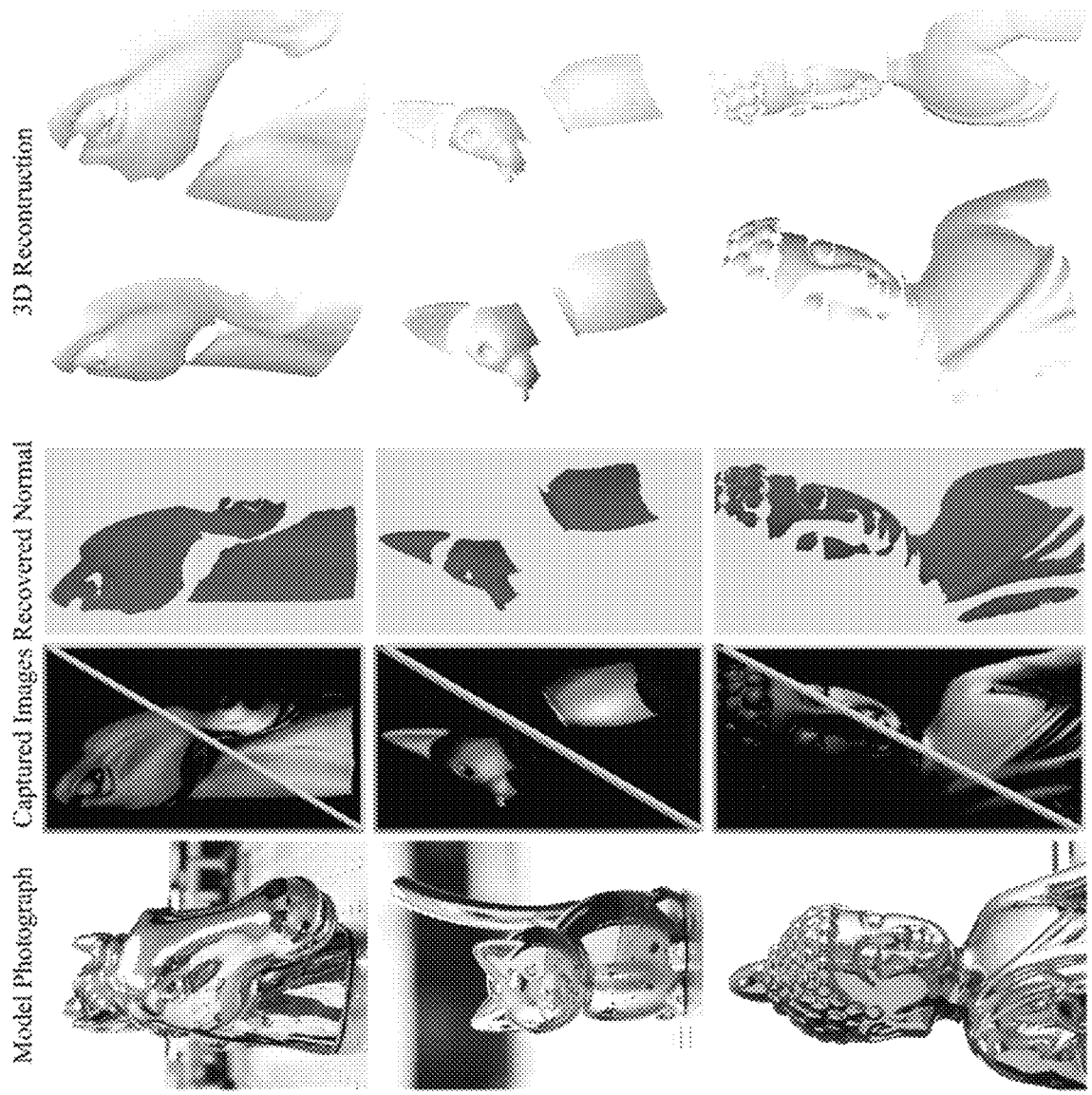
FIG. 10 shows real experimental results obtained for three mirror objects.

The experiments were performed on three real mirror objects, namely, statues of a buddha, a horse and a cat. These objects are of various sizes. The horse and buddha are around 100 mm×100 mm×200 mm and the cat is around 30 mm×50 mm×100 mm. These objects are made of Nickel (Ni) with refractive index $n_m=1.96+3.84i$. All three objects are placed around 10 cm in front of the display. FIG. 10 shows the reconstruction results. For each object, FIG. 10 shows the real photograph of the object, captured images of the object at gray level 0 (red) and 255 (green), a reconstructed normal map and reconstructed 3-D surfaces. It is worth noting that the cat eye is concave while the approach described herein still produces reliable reconstruction.

Figure 11:
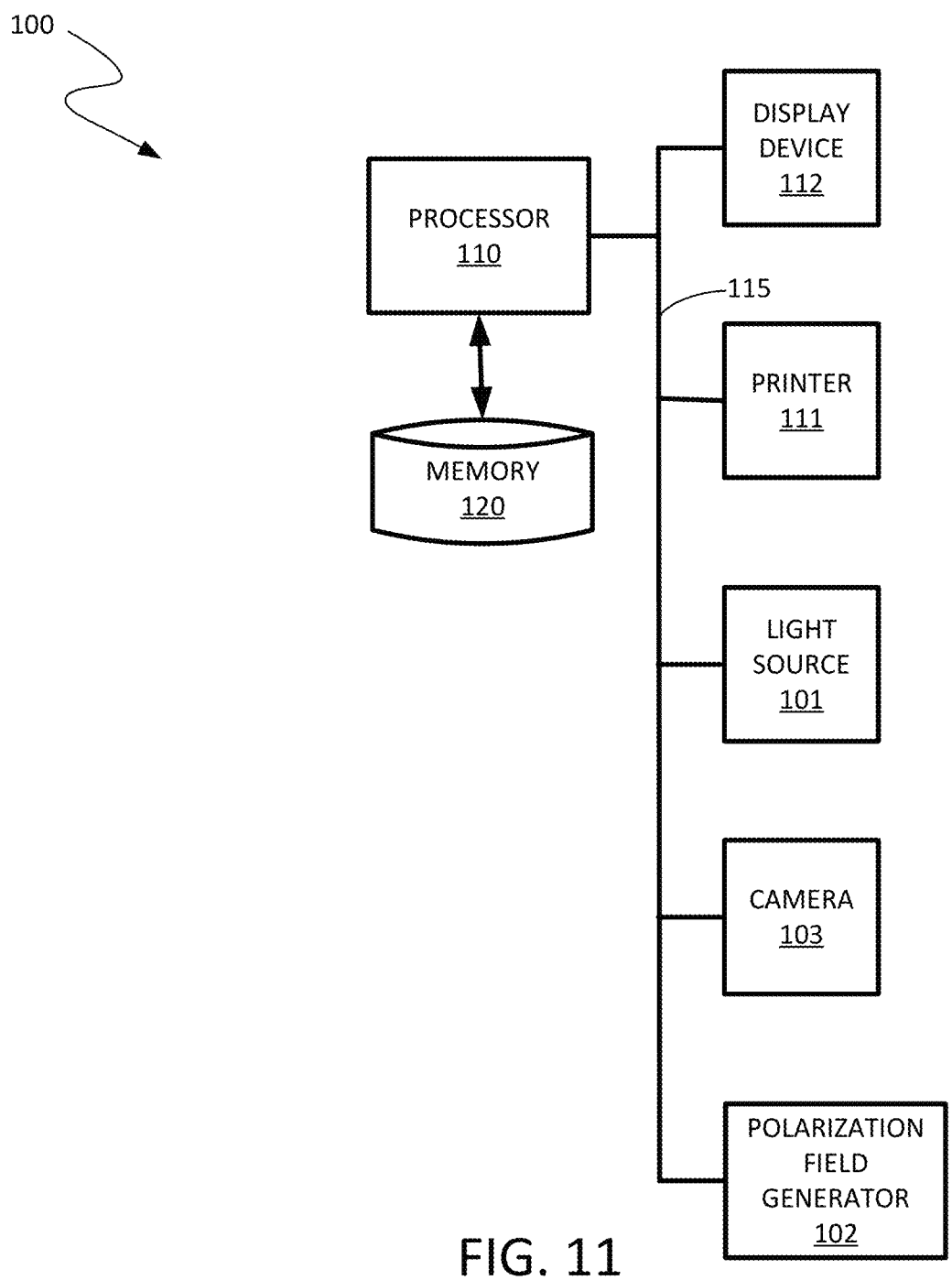
FIG. 11 is a block diagram of the system in accordance with a representative embodiment for performing 3-D point cloud reconstruction.

FIG. 11 is a block diagram of the system 100 in accordance with a representative embodiment. The system 100 comprises a light source 101, a polarization field generator 102, a camera 103 and a processor 110, which performs the algorithms discussed above. The system 100 also typically includes a memory device 120 that stores the computer instructions corresponding to algorithms that are performed by the processor 110 and data. The system 100 may optionally include one or more output devices, such as a printer 111 and a display device 112 for printing and displaying the reconstructed images. The light source 101, the polarization field generator 102, the camera 103, the optional printer 111 and the optional display device 112 may be connected to a bus 115 to which the processor 110 is also connected to allow the processor 110 to control operations performed by those devices. However, while the bus 115 represents a wired connection, one or more of these devices may communicate via one or more wireless links.

Figure 12:
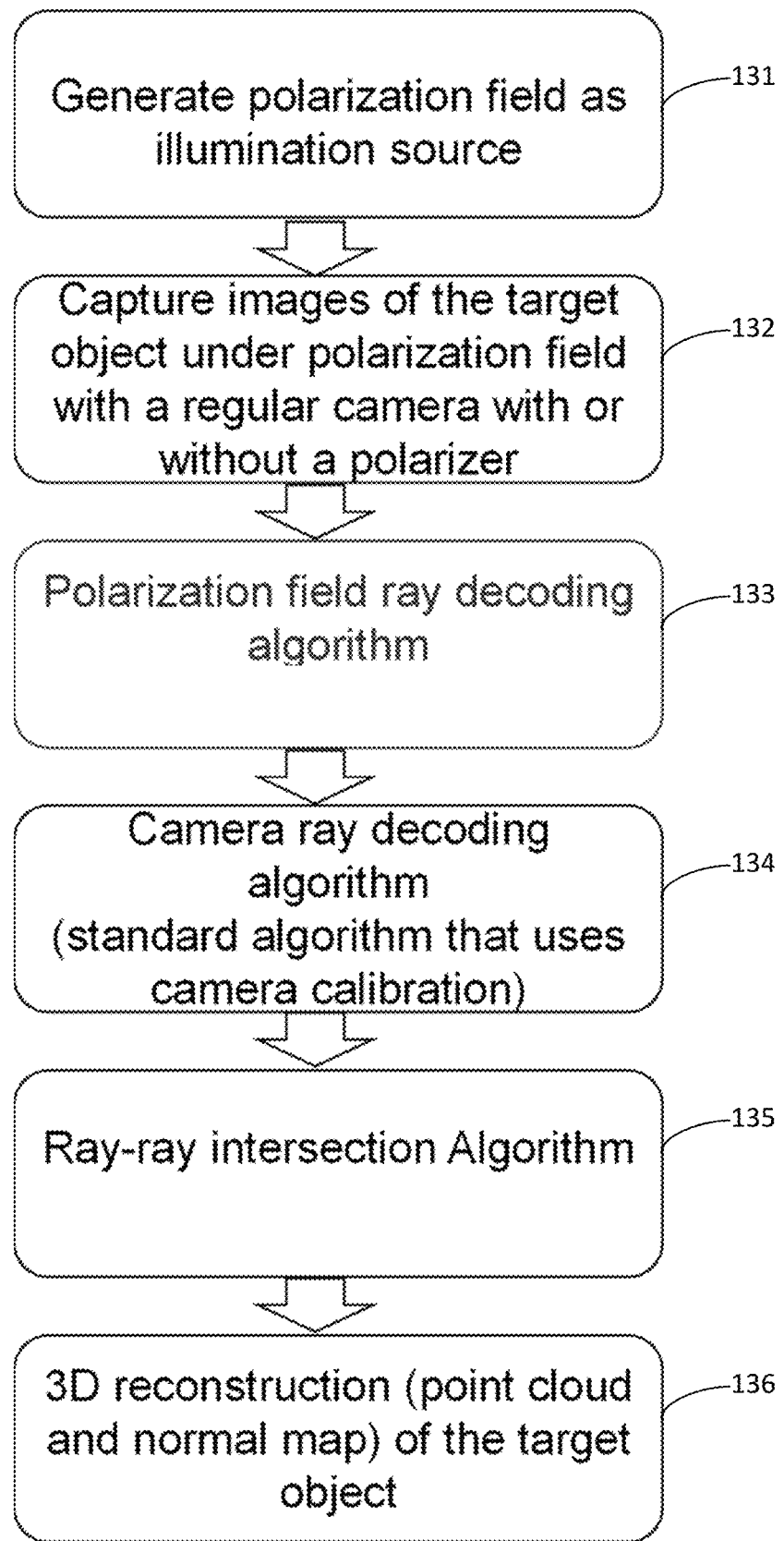
FIG. 12 is a flow diagram of the method in accordance with a representative embodiment for performing 3-D point cloud reconstruction.

FIG. 12 is a flow diagram representing the method in accordance with a representative embodiment. Block 131 represents the steps of emitting light from a light source and receiving the emitted light with a polarization field generator to generate a polarization field that illuminates the target object being imaged for reconstruction. Block 132 represents the step of a camera capturing images of the illuminated target object. It should be noted that the camera may be equipped with a polarizer, but is not required to be equipped with a polarizer. Block 133 represents the processor receiving the captured images and performing a polarization field decoding algorithm that decodes the polarization field to obtain a set of incident rays, which was discussed above with reference to Equations 8-17. Block 134 represents the processor performing a camera ray decoding algorithm to obtain a set of camera rays. This can be a standard algorithm that uses camera calibration, as will be understood by those of skill in the art in view of the description provided herein.

Block 135 represents the processor performing a ray-ray intersection algorithm that determines intersection points where the incident rays and the camera rays intersect, which was discussed above with reference to Equations 18 and 19. Block 136 represents the processor performing a 3-D reconstruction algorithm that uses the set of incident rays, the set of camera rays and the intersection points to reconstruct a 3-D image. 3-D reconstruction algorithms exist that can be used for this purpose.

The flow diagram of FIG. 12 shows the functionality and operation of a possible implementation of algorithms performed by the processor 110. Many variations may be made to the method represented by the flow diagram while still achieving the goals described herein. Also, while particular algorithms have been described herein for carrying out specific tasks, other algorithms not specifically mentioned herein may be used to accomplish the same task.

It should be noted that any or all portions of algorithms described above that are implemented in software and/or firmware being executed by a processor (e.g., processor 110) can be stored in a non-transitory memory device, such as the memory device 120. For any component discussed herein that is implemented in the form of software or firmware, any one of a number of programming languages may be employed such as, for example, C, C++, C#, Objective C, Java®, JavaScript®, Perl, PHP, Visual Basic®, Python®, Ruby, Flash®, or other programming languages. The term "executable" means a program file that is in a form that can ultimately be run by the processor 110. Examples of executable programs may be, for example, a compiled program that can be translated into machine code in a format that can be loaded into a random access portion of the memory device 120 and run by the processor 110, source code that may be expressed in proper format such as object code that is capable of being loaded into a random access portion of the memory device 120 and executed by the processor 110, or source code that may be interpreted by another executable program to generate instructions in a random access portion of the memory device 120 to be executed by the processor 110, etc. An executable program may be stored in any portion or component of the memory device 120 including, for example, random access memory (RAM), read-only memory (ROM), hard drive, solid-state drive, USB flash drive, memory card, optical disc such as compact disc (CD) or digital versatile disc (DVD), floppy disk, magnetic tape, static random access memory (SRAM), dynamic random access memory (DRAM), magnetic random access memory (MRAM), a programmable read-only memory (PROM), an erasable programmable read-only memory (EPROM), an electrically erasable programmable read-only memory (EEPROM), or other like memory device.

CONCLUSIONS AND DISCUSSIONS

In the present disclosure, an approach has been presented for reconstructing complex mirror surfaces using a polarization field, which is generated by a commercial LCD without top polarizer in the representative embodiment. It has been shown that the angular information embedded in the polarization field can effectively resolve ambiguities in mirror surface reconstruction. To recover mirror surfaces, an image formation model has been derived under the polarization field and an optimization algorithm has been optimized for estimating the incident ray. Comprehensive experiments disclosed herein on simulated and real surfaces have demonstrated the effectiveness of our approach.

Although this disclosure demonstrates using the polarization field for mirror surface reconstruction, the inventive principles and concepts apply to 3-D reconstruction of other types of objects.

It should be emphasized that the above-described embodiments of the present invention are merely possible examples of implementations, merely set forth for a clear understanding of the inventive principles and concepts. Many variations and modifications may be made to the above-described embodiments without departing from the scope of the present disclosure. All such modifications and variations are intended to be included herein within the scope of this disclosure and protected by the following claims.

What is claimed is:

1. A system for reconstructing a three-dimensional (3-D) point cloud of a target object, the system comprising:
   a light source that generates light;
   a polarization field generator that receives the light generated by the light source and generates a polarization field that illuminates the target object at a polarization state with an ellipticity based on an intensity of voltage input to the polarization field generator;
   a camera that captures images of the illuminated target object; and
   a processor that receives the captured images and processes the captured images by:
     performing a polarization field decoding algorithm that decodes the polarization field to obtain a set of incident rays;
     performing a camera ray decoding algorithm to obtain a set of camera rays;
     performing a ray-ray intersection algorithm that determines intersection points where the set of incident rays and the set of camera rays intersect; and
     performing a 3-D reconstruction algorithm that uses the set of incident rays, the set of camera rays and the intersection points to reconstruct a 3-D point cloud of the target object.

2. The system of claim 1, wherein the processor controls operations of the light source and of the polarization field generator to generate the polarization field such that the target object is illuminated with a preselected sequence of Gray Code images, and
   wherein the polarization field decoding algorithm decodes Gray Code images that are captured by the camera to determine which pixel of the polarization field generator originated each incident ray of the set of incident rays to thereby determine a direction of each incident ray of the set of incident rays.

3. The system of claim 1, wherein the polarization field generator comprises a polarizer panel of a liquid crystal display (LCD) device.

4. The system of claim 1, wherein the target object is an object that exhibits reflection of the environment.

5. The system of claim 1, wherein the polarization field generator is configured to alter a polarization state of the polarization field in response to an applied voltage.

6. The system of claim 5, wherein the polarization state varies between linear polarization to elliptical polarization.

7. A method for reconstructing a three-dimensional (3-D) point cloud of a target object, the method comprising:
  with a light source, emitting light;
  with a polarization field generator, receiving at least a portion of the light and generating a polarization field that illuminates the target object at a polarization state with an ellipticity based on an intensity of voltage input to the polarization field generator;
  with a camera, capturing images of the illuminated target object; and
  with a processor, receiving the captured images and processing the captured images by:
    performing a polarization field decoding algorithm that decodes the polarization field to obtain a set of incident rays;
    performing a camera ray decoding algorithm to obtain a set of camera rays;
    performing a ray-ray intersection algorithm that determines intersection points where the set of incident rays and the set of camera rays intersect; and
    performing a 3-D reconstruction algorithm that uses the set of incident rays, the set of camera rays and the intersection points to reconstruct a 3-D point cloud of the target object.

8. The method of claim 7, further comprising:
  with the processor, controlling operations of the light source and of the polarization field generator to generate the polarization field such that the target object is illuminated with a preselected sequence of Gray Code images, and
  wherein the polarization field decoding algorithm decodes Gray Code images that are captured by the camera to determine which pixel of the polarization field generator originated each incident ray of the set of incident rays to thereby determine a direction of each incident ray of the set of incident rays.

9. The method of claim 7, wherein the polarization field generator comprises a polarizer panel of a liquid crystal display (LCD) device.

10. The method of claim 7, wherein the target object is an object that exhibits reflection of the environment.

11. The method of claim 7, wherein the polarization field generator is configured to alter a polarization state of the polarization field in response to an applied voltage.

12. The method of claim 11, wherein the polarization state varies between linear polarization to elliptical polarization.

13. A computer program comprising computer instructions embodied on a non-transitory computer readable medium, the computer program being designed to reconstruct a three-dimensional (3-D) point cloud of a target object, wherein a light source emits light that is received by a polarization field generator that generates a polarization field that illuminates the target object at a polarization state with an ellipticity based on an intensity of voltage input to the polarization field generator, and wherein a camera captures images of the illuminated target object, the computer program being executed by a processor that receives the captured images from the camera, the computer instructions comprising:
  a first instruction set that performs a polarization field decoding algorithm that decodes the polarization field to obtain a set of incident rays;
  a second instruction set that performs a camera ray decoding algorithm to obtain a set of camera rays;
  a third instruction set that performs a ray-ray intersection algorithm that determines intersection points where the set of incident rays and the set of camera rays intersect; and
  a fourth instruction set that performs a 3-D reconstruction algorithm that uses the set of incident rays, the set of camera rays and the intersection points to reconstruct a 3-D point cloud of the target object.

14. The computer program of claim 13, further comprising:
  a fifth instruction set that controls operations of the light source and of the polarization field generator to generate the polarization field such that the target object is illuminated with a preselected sequence of Gray Code images, and
  wherein the polarization field decoding algorithm includes instructions that decode Gray Code images that are captured by the camera to determine which pixel of the polarization field generator originated each incident ray of the set of incident rays to thereby determine a direction of each incident ray of the set of incident rays.

15. The computer program of claim 13, wherein the polarization field generator comprises a polarizer panel of a liquid crystal display (LCD) device.

16. The computer program of claim 13, wherein the target object is an object that exhibits reflection of the environment.

17. The computer program of claim 13, wherein the polarization field generator is configured to alter a polarization state of the polarization field in response to an applied voltage.

18. The computer program of claim 17, wherein the polarization state varies between linear polarization to elliptical polarization.

* * * * *